May 7, 1963 E. C. EVANS ET AL 3,088,710
METHOD AND APPARATUS FOR DEPTH REGULATION
Filed Feb. 26, 1962 2 Sheets-Sheet 1

INVENTORS
ELMER C. EVANS
CARL J. SCHIPEK
BY
ATTORNEYS

May 7, 1963  E. C. EVANS ET AL  3,088,710
METHOD AND APPARATUS FOR DEPTH REGULATION
Filed Feb. 26, 1962  2 Sheets-Sheet 2
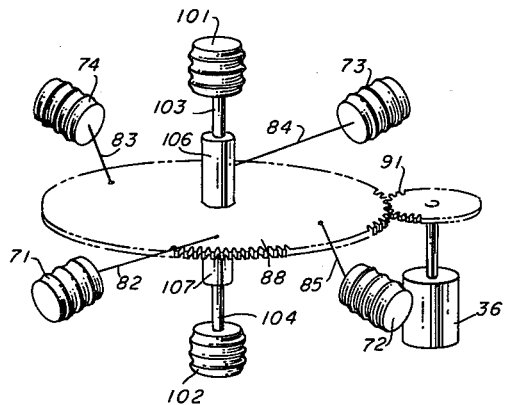
FIG. 4
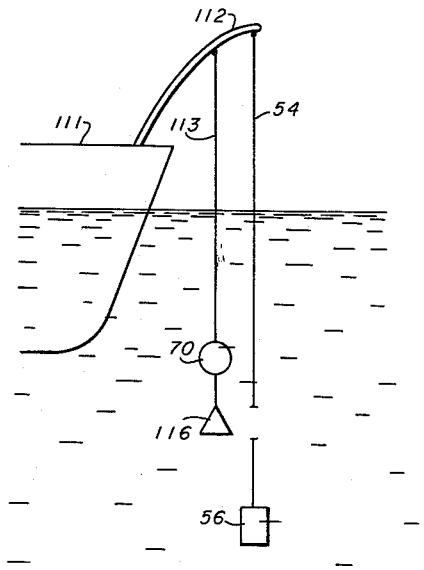
FIG. 5
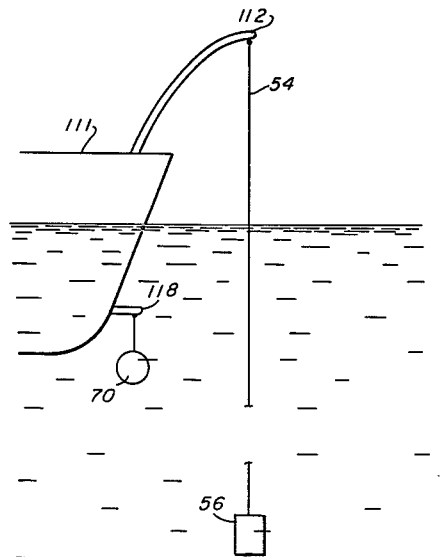
FIG. 6
INVENTORS
ELMER C. EVANS
CARL J. SHIPEK
BY
ATTORNEYS United States Patent Office 3,088,710
Patented May 7, 1963

3,088,710
METHOD AND APPARATUS FOR DEPTH REGULATION
Elmer C. Evans, 7976 Lemon Circle, La Mesa, Calif., and Carl J. Shipek, 3639 Pio Pico, San Diego, Calif.
Filed Feb. 26, 1962, Ser. No. 175,857
4 Claims. (Cl. 254—172)
(Granted under Title 35, U.S. Code (1952), sec. 266)

The invention described herein may be manufactured and used by or for the Government of the United States of America for governmental purposes without the payment of any royalties thereon or therefor.

This invention pertains to a method and apparatus for regulating depth of a liquid-immersed object.

Often liquid-immersed apparatus is suspended from a platform which is susceptible to undesired, irregular or random motion. Specific examples of such platforms are ships and helicopters. The following items are but a few examples of the many devices that are immersed and suspended in the sea: temperature sensing instruments; coring equipment; photographic cameras; vertical biological nets; television cameras, light meters; and sonar transducers. It is often desirable to maintain liquid-immersed and suspended equipments at a constant depth. When equipments such as those enumerated above are lowered from a ship, the depth of the equipment fluctuates as the ship moves on the surface of the sea. The problems caused by an unsteady suspension platform are immediately apparent. For example, when a movie camera is lowered by cable from a ship for the purpose of photographing the ocean floor, there is a predetermined distance from the ocean floor at which the camera is in focus. As the ship rolls, pitches, bobs and so forth on the sea, the camera is correspondingly raised and lowered above the ocean floor. As a result, the movie camera is in proper focus only a small percentage of the total shooting time and the camera is often dashed against the ocean floor.

Lacking equipment with which to suspend liquid-immersed apparatus in the sea at a constant depth, men have gone so far as to resort to supporting the apparatus from a submarine. The depth limitations and operating costs of a submarine are merely two examples of drawbacks attached to such a scheme.

An object of the invention is to provide a method for quickly and accurately regulating depth of a submerged object.

An object of the invention is to provide an apparatus capable of high sensitivity and quick response for regulating the depth of a liquid-immersed object.

A further object of the invention is to provide a depth regulating system having a high degree of resolution.

For a better understanding of the present invention, together with other and further objects and features thereof, reference is had to the following description taken in connection with the accompanying drawings, wherein.

Figure 2:
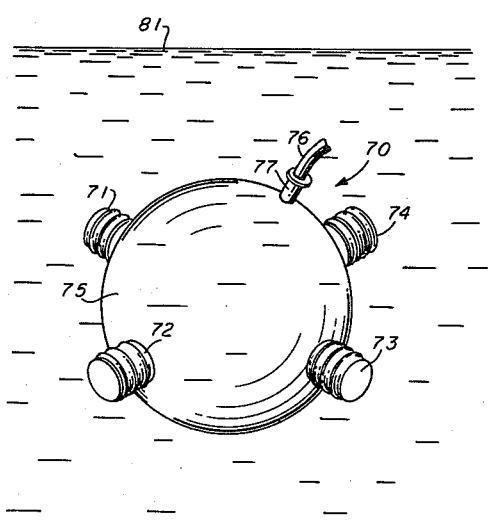
FIG. 2 shows a suitable sensing transducer for the apparatus illustrated in FIG. 1.
Figure 3:
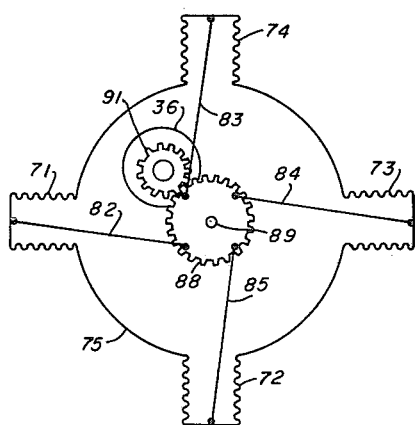

FIG. 3 schematically illustrates apparatus contained within the sensing transducer of FIG. 2;

FIG. 4 illustrates schematically an alternate sensor arrangement;

FIG. 5 schematically illustrates a manner in which the sensing transducer may be suspended; and FIG. 6 schematically illustrates an alternate manner in which the sensing transducer may be suspended in a liquid.

Figure 1:
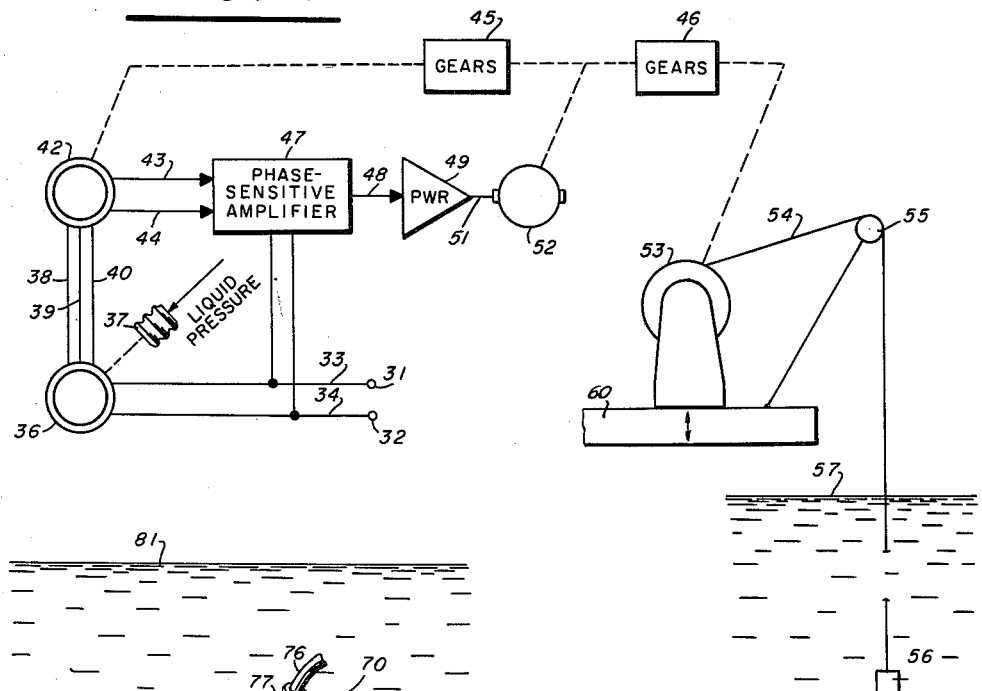
FIG. 1 illustrates in block diagram depth regulation apparatus in accordance with the invention.

FIG. 1 illustrates, by way of a block diagram, depth regulating apparatus in accordance with the invention. The apparatus of FIG. 1 is provided with alternating current input terminals 31 and 32. A source of constant amplitude alternating current (not shown), for example, a 115-volt, 60-c.p.s. source, is connected thereto. The source of alternating current is coupled to a phase-sensitive amplifier 47 and the rotor of a synchro transmitter 36 via connections 33 and 34. Amplifier 47 is an amplifier of the type which is capable of producing an output signal which is proportional to the phase difference between two input alternating current signals. The stator of synchro transmitter 36 is connected to the stator of synchro control transformer 42 by means of connections 38, 39 and 40. In operation, both synchro transmitter 36 and bellows 37 are stationed in the liquid with suitable protection being provided for the transmitter and the electrical connections thereto. Collectively they form a sensing transducer or sensor. Static pressure exerted on bellows 37 varies directly with the depth of the bellows. In sea water, for example, the static pressure increases 0.446 p.s.i. for each foot of depth. Bellows 37 is mechanically linked with the rotor of synchro transmitter 36 so that the linear motion of bellows 37 is converted to rotary motion of the rotor. Voltages, if any, induced in the rotor synchro control transformer 42 are fed to one input of phase-sensitive amplifier 47 as error voltages by means of connections 43 and 44. The output signal of amplifier 47 is fed to the input of power amplifier 49 by means of connection 48. The output of amplifier 49 is coupled to motor 52 by means of connection 51.

Amplifier 49 has sufficient power gain to drive motor 52. The amplifier may be either a conventional electronic amplifier or a dynamo-electric amplifier. Suitable dynamo-electric amplifiers may be, for example, single-stage generators, multiple-stage generator systems, or high-gain, high-sensitivity generators such as the amplidyne.

The rotor of motor 52 is connected to the rotor of synchro transformer 42 by means of gears 45. The rotor of motor 52 is also connected to winch 53 by means of gears 46. As motor 52 turns, cable 54 is either played out or reeled in on winch 53 depending on the direction of rotation of motor 52. Cable 54 passes over pulley 55 which may, for example, be secured on a boom. Object 56 is fastened to the end of cable 54 and submerged in liquid 57. Object 56 is the object to be maintained at a constant depth and may be, for example, a movie camera, a TV camera, a sampling device, a temperature measuring instrument and so forth.

In operation, the winch and the other components preceding it are attached to a platform 60 susceptible to random vertical motion which is above, on or below a liquid body. Synchro transmitter 36 and bellows 37 are mechanically attached to the platform through the cable and winch and are always immersed in the liquid. They are immersed at a sufficient depth so that they will never leave the liquid under any movement of the platform which may be, for example, a ship. The A.C. signal applied to the rotor of synchro transmitter 36 induces a voltage in the stator of the transmitter. The induced voltage is coupled to the stator of transformer 42 by means of connections 38—40 wherein it induces a voltage in the rotor of the transformer. This transformer rotor voltage appears on connections 43 and 44 as an error voltage which varies in magnitude as well as phase depending on the angular displacement existing between the rotor of transformer 42 and the rotor of transmitter 36. When the rotor winding of control transformer 42 is displaced 90 degrees with respect to the rotor winding of synchro transmitter 36, the transformer rotor voltage is zero. If the rotor of transmitter 36 is then moved in either direction a voltage will be produced in the transformer and the magnitude of the voltage will vary directly with the magnitude of the displacement. When the transmitter rotor is rotated in one direction, the transformer rotor voltage is in phase with the transmitter rotor voltage, and conversely, when the transformer rotor is rotated in the opposite direction the rotor voltages are displaced 180 electrical degrees.

Phase-sensitive amplifier 47 compares the error voltage, if any, from the transformer rotor with the voltage from input terminals 31 and 32, which serves as a reference voltage, and produces a D.C. output signal which has a polarity depending on the phase relationship between the two input signals and has a magnitude directionally proportional to the magnitude of the error voltage. The output voltage of phase-sensitive amplifier 47 is amplified in amplifier 49. The amplified output signal of power amplifier 49 drives motor 52 in either a clockwise or counterclockwise direction depending upon the phase relationship existing between the input voltages to phase-sensitive amplifier 47. Rotor 52 is geared to the rotor of synchro control transformer 42 and is also geared to winch 53. As motor 52 rotates it tends to rotate the rotor of control transformer 42 in such a direction so as to reduce the error voltage. When the error voltage is reduced to zero, rotor 52 stops rotating.

The synchros are initially calibrated so as to produce a zero error voltage when bellows 37 is stationed at its normal predetermined depth in liquid 57. Thus, if the platform and the bellows move in the vertical direction the bellows will contract or expand, rotate the transmitter rotor and cause an error voltage to be produced on connections 43 and 44. When the bellows is lowered in the liquid, the increased static pressure on the bellows causes it to contract and an error voltage is produced such that motor 52 turns winch 53 in a counterclockwise direction. This winch action raises object 56 in liquid 57. Conversely, when the bellows is raised in the liquid due to upward motion of the platform, an error voltage is produced which causes motor 52 to rotate winch 53 in a clockwise direction. In this manner, random motions of the platform are nullified by quick and precise adjustments of winch 53 so that object 56 maintains a constant depth in liquid 57.

It should be understood that in applications where motor 52 is small, amplifier 49 may be omitted, and the output signal from amplifier 47 may be used to directly drive motor 52.

It should be appreciated that winch 53 and the associated apparatus may be supported on an aerial platform, such as a helicopter, or on a submerged platform such as a submarine.

The number of bellows used to actuate the rotor of synchro transmitter 36 need not be restricted to one. FIG. 2 illustrates multiple-bellows, pressure-sensing apparatus suitable for use in the apparatus of FIG. 1. Liquid-tight spheroid 75 is fitted with four bellows which are spaced about the perimeter of the spheroid (bellows 71, 72 and 73 are shown in FIG. 2). The four bellows are liquid impervious and joined to the spheroid 75 by means of any suitable liquid-tight seals. The end plates of the bellows are all mechanically connected to the rotor of a synchro transmitter (not shown in FIG. 2) contained within the spheroid. The pressure exerted by liquid 81 on the end plates of the bellows causes the bellows to compress. As the sensing apparatus or sensor 70 is lowered in the water the static pressure exerted on the end plates of the bellows by liquid 81 increases and causes the rotor of the synchro transmitter contained within the spheroid to turn in one direction and conversely, when the apparatus is raised in liquid 81 the pressure on end plates of the bellows decreases and the bellows expand causing the rotor of the self-contained synchro transmitter to rotate in the opposite direction. The rotor and stator connection of the synchro transmitter contained within the spheroid 75 are brought out through the spheroid through liquid tight plug 77 in the form of cable 76. In operation, the sensor is moved in the liquid 81 in the same direction as the platform which supports the sensor. The streamlined shape of sensor 70 enables the sensor to move through the water with a minimum of turbulence. The plurality of bellows on the sensor enables an accurate equalized pressure measurement to be obtained.

FIG. 3 illustrates a section of the sensing apparatus of FIG. 2. Bellows 71–74 are attached to spheroid 75. Rigid arms 82 to 85 are pivotally attached to the end plates or diaphragms of bellows 71–74, respectively and to the gear 88 which is pivoted at point 89. Gear 91 is fastened to the rotor of synchro transmitter 36 and the teeth of gear 91 engage the teeth of gear 88. Thus, the linear motion of the end plates or diaphragms of bellows 71–74 is converted to rotary motion of transmitter rotor 36.

FIG. 4 schematically illustrates an alternate sensor embodiment wherein six bellows are employed rather than four. The end plates of bellows 101 and 102 are transversely disposed to the end plates of bellows 71–74. Rods 103 and 104 are attached to the end plates of bellows 101 and 102, respectively. The other ends of rods 103 and 104 engage with interiorly situated threads in sleeves 106 and 107, respectively. Sleeves 106 and 107 are fixedly attached to gear 88. Thus, when the end plates of bellows 101 and 102 are depressed, rods 103 and 104 move inwardly in sleeves 106 and 107 causing sleeves 106 and 107 and gear 88 to rotate. Conversely, when bellows 102 and 101 expand, rods 103 and 104, respectively move outwardly from sleeves 106 and 107 and these sleeves and gear 88 are caused to rotate in the opposite direction. The shell or housing for the synchro transmitter and so forth may be similar to the one disclosed in FIG. 2.

The pressure-sensitive transducer or sensor comprising synchro transmitter 36 and one or more bellows must be immersed in the liquid along with the object suspended on the cable and must be free to move in conjunction with the motion of the object suspended on the cable. It is only necessary that the sensor be immersed in the liquid to a depth sufficient so that any motion of the platform will not remove the sensor from the liquid. The sensor may be attached directly to the cable 54 which supports object 56 in the liquid. The five electric cables needed to transmit and receive signals from the transmitter may be carried, for example, in the interior of support cable 54.

Sensor 70 may also be positioned adjacent cable 54 so long as it moves in an amount proportional to cable 54 and object 56. For example, sensor 70 may be suspended from a cable which is positioned adjacent to cable 54.

FIG. 5 shows a two-cable setup for use on a surface craft. Cables 54 and 113 are suspended from boom 112 on ship 111. Cable 54 is played out from winch 53 (not shown). A weight 116 is attached to the end of cable 113 and sensor 70 is attached to the cable above the weight. Object 56 is free to descend to any depth. Sensor 70 is lowered in the liquid an amount sufficient to keep it constantly immersed regardless of the motion of ship 111. Thus, as ship 111 pitches, rolls and tosses on the surface of the sea, cables 113 and 54 are moved through the liquid simultaneously and nearly equal amounts. Although the absolute static pressure experienced by sensor 70 is not the same absolute static pressure experienced by object 56, the motion of sensor 70 causes sensor 70 to experience a pressure differential which is proportional to the total movement of object 56. This static pressure differential will cause an error voltage to be generated and this voltage will cause winch 53 to move cable 54 up or down to compensate for the motion of the winch platform.

FIG. 6 illustrates an alternate arrangement for immersing sensor 70. A boom 118 is attached to the side of ship 111 below the water level so that boom 118 will be below the surface of the water for any motion of ship 111. Sensor 70 is attached to the end of the boom and, thus, as ship 111 rolls and moves in the water sensor 70, is moved an amount proportional to suspended object 56.

Although the sensitivity of the sensor will not be as great as in the arrangement of FIG. 6, the sensor may be directly fastened to the hull of a ship below the water line and at a point corresponding to the lowering point of the cable.

Obviously many modifications and variations of the present invention are possible in the light of the above teachings. It is therefore to be understood that within the scope of the appended claims the invention may be practiced otherwise than as specifically described.

What is claimed is:

1. A system for regulating the depth of a liquid-immersed object that is cable-suspended from a vacillating platform comprising a sensor, said sensor being immersed in said liquid, connected to said platform and free to move therewith, said sensor producing an output signal corresponding to its instantaneous depth in said liquid, means coupled to said sensor for generating an error signal, a reference-signal generator, means coupled to said generator and said generating means for comparing the phase and magnitude of said reference and error signals, means coupled to said comparing means and said cable for moving said cable in proportion to the difference between the phase and magnitude of said signals.

2. Apparatus according to claim 1 wherein said sensor comprises a bellows compressible under the static pressure of said liquid, a synchro transmitter having a rotor, and means for converting the linear motion of said bellows to rotary motion of said synchro transmitter.

3. Apparatus according to claim 1 wherein said sensor comprises a plurality of liquid-compressible bellows, a synchro transmitter having a rotor, and means for converting the compressive motion of said bellows to rotary motion of said synchro transmitter.

4. In a system for regulating the depth of a liquid-submerged object that is suspended by a cable from a vacillating platform, means connected to said platform and submerged in said liquid for measuring ambient static pressure, said means producing an output signal proportional to said measured static pressure, a transformer having an input and an output, means for coupling said output signal to said transformer input, a phase-sensitive amplifier having first and second inputs and an output, means for generating a reference signal, means for coupling said generating means to said first input, means for coupling said transformer output to said second input, means having an input for moving said cable, and means for coupling said amplifier output to said input of said moving means.

References Cited in the file of this patent

UNITED STATES PATENTS 2,650,046     Vanderlip _____ Aug. 25, 1953